US011151780B2

(12) United States Patent
Dong et al.

(10) Patent No.: US 11,151,780 B2
(45) Date of Patent: Oct. 19, 2021

(54) LIGHTING ESTIMATION USING AN INPUT IMAGE AND DEPTH MAP

(71) Applicant: Microsoft Technology Licensing, LLC, Redmond, WA (US)

(72) Inventors: Yue Dong, Redmond, WA (US); Guojun Chen, Redmond, WA (US); Xin Tong, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/044,270

(22) PCT Filed: May 13, 2019

(86) PCT No.: PCT/US2019/031907
§ 371 (c)(1),
(2) Date: Sep. 30, 2020

(87) PCT Pub. No.: WO2019/226366
PCT Pub. Date: Nov. 28, 2019

(65) Prior Publication Data
US 2021/0027526 A1    Jan. 28, 2021

(30) Foreign Application Priority Data

May 24, 2018   (CN) .......................... 201810510214.1

(51) Int. Cl.
*G06T 15/60*    (2006.01)
*G06T 15/80*    (2011.01)
(Continued)

(52) U.S. Cl.
CPC ........... *G06T 15/60* (2013.01); *G06N 3/0454* (2013.01); *G06T 15/506* (2013.01); *G06T 15/80* (2013.01); *G06T 17/20* (2013.01)

(58) Field of Classification Search
CPC ....... G06T 15/506; G06T 15/60; G06T 15/80; G06T 17/20; G06T 7/507; G06T 2207/10028; G06N 3/0454
See application file for complete search history.

(56) References Cited

U.S. PATENT DOCUMENTS 6,791,542 B2   9/2004  Matusik et al.
9,857,470 B2   1/2018  Hilliges et al.
(Continued)

FOREIGN PATENT DOCUMENTS

WO    2017171005 A1    10/2017

OTHER PUBLICATIONS

D Santos, Artur Lira, et al. "Real time ray tracing for augmented reality." 2012 14th Symposium on Virtual and Augmented Reality. IEEE, 2012. (Year: 2012).*
(Continued)

*Primary Examiner* — Daniel F Hajnik
(74) *Attorney, Agent, or Firm* — Schwegman Lundberg & Woessner, P.A.

(57) ABSTRACT

In accordance with implementations of the subject matter described herein, there is provided a solution of lighting estimation. In the solution, an input image about a real object and a depth map corresponding to the input image are obtained. A geometric structure of the scene in the input image is determined based on the depth map. Shading and shadow information on the real object caused by a light source in the scene is determined based on the determined geometric structure of the scene. Then, a lighting condition in the scene caused by the light source is determined based on the input image and the shading and shadow information. The virtual object rendered using the lighting condition obtained according to the solution can exhibit a realistic effect consistent with the real object.

18 Claims, 7 Drawing Sheets

(51) Int. Cl.
G06T 17/20 (2006.01)
G06T 15/50 (2011.01)
G06N 3/04 (2006.01)

(56) References Cited

U.S. PATENT DOCUMENTS

| | | | |
|---|---|---|---|
| 2013/0251243 | A1 | 9/2013 | Shim et al. |
| 2015/0022640 | A1* | 1/2015 | Metzler ................ H04N 5/232 348/46 |
| 2015/0262412 | A1 | 9/2015 | Ventura et al. |
| 2015/0279113 | A1 | 10/2015 | Meier et al. |
| 2016/0364914 | A1 | 12/2016 | Todeschini |

OTHER PUBLICATIONS

Abadi, et al., "TensorFlow: Large-Scale Machine Learning on Heterogeneous Distributed Systems", In Repository of arXiv:1603.04467, Mar. 16, 2016, 19 Pages.

Barron, et al., "Intrinsic Scene Properties from a Single RGB-D Image", In Proceedings of the IEEE Conference on Computer Vision and Pattern Recognition, Jun. 23, 2013, pp. 17-24.

Barron, et al., "Shape, Illumination, and Reflectance from Shading", In Proceedings of the IEEE Transactions on Pattern Analysis and Machine Intelligence vol. 37, Issue 8, Aug. 1, 2015, pp. 1670-1687.

Bonneel, et al., "Displacement Interpolation Using Lagrangian Mass Transport", ACM Transactions on Graphics, vol. 30, Issue 6, Dec. 2011, 11 Pages.

Chang, et al., "ShapeNet: An information-Rich 3D Model Repository", In Journal of the Computing Research Repository, Dec. 9, 2015, 11 Pages.

Debevec, Paul, "Rendering Synthetic Objects into Real Scenes: Bridging Traditional and Image-based Graphics with Global Illumination and High Dynamic Range Photography", In ACM SIGGRAPH, Article No. 32, Aug. 11, 2008, 10 Pages.

Gardner, et al., "Learning to Predict Indoor Illumination from a Single Image", In Repository of arXiv:1704.00090, Nov. 21, 2017, 14 Pages.

Georgoulis, et al., "Reflectance and Natural Illumination from Single-Material Specular Objects using Deep Learning", In Journal of IEEE Transactions on Pattern Analysis and Machine Intelligence, vol. 40, Issue 8, Aug. 22, 2017, 14 Pages.

Georgoulis, et al., "What is Around the Camera?", In Proceedings of the IEEE International Conference on Computer Vision, 2017, pp. 5170-5178.

Hinton, et al., "Distilling the Knowledge in a Neural Network", In Repository of arxiv, arXiv:1503.02531, Mar. 9, 2015, 9 Pages.

Hold-Geoffroy, et al., "Deep outdoor Illumination Estimation", In Proceedings of IEEE Conference on Computer Vision and Pattern Recognition, Jul. 2017, pp. 7312-7321.

Jensen, et al., "Real-Time Image Based Lighting for Outdoor Augmented Reality under Dynamically Changing Illumination Conditions", In Proceedings of the First International Conference on Computer Graphics Theory and Applications, Feb. 25, 2006, 8 Pages.

Karsch, et al., "Automatic Scene Inference for 3D Object Compositing", In Journal of ACM Transactions on Graphics, vol. 28, Issue 4, May 2014, 15 Pages.

Karsch, et al., "Rendering Synthetic Objects into Legacy Photographs", In ACM Transactions on Graphics, vol. Issue 6, Article 157, Dec. 12, 2011, 12 Pages.

Khan, et al., "Image-Based Material Editing", In ACM Transactions on Graphics, vol. 25, Issue 3, Jul. 1, 2006, pp. 654-663.

Kingma, et al., "Adam: A Method for Stochastic Optimization", In Proceedings of the 3rd International Conference for Learning Representations, Jul. 23, 2015, 15 Pages.

Kronander, et al., "Photorealistic Rendering of Mixed Reality Scenes", In Proceedings of 36th Annual Conference of the European Association for Computer Graphics, vol. 34, Issue 2, May 4, 2015, 23 Pages.

Li, et al., "Modeling Surface Appearance from a Single Photograph using Self-augmented Convolutional Neural Networks", In Journal of ACM Transactions on Graphics, vol. 36, Issue 4, Jul. 2017, 11 Pages.

Lombardi, et al., "Reflectance and Illumination Recovery in the Wild", In Proceedings of the IEEE Transactions on Pattern Analysis and Machine Intelligence, vol. 38, Issue 1, Jan. 1, 2016, pp. 129-141.

Nishino, et al., "Eyes for Relighting", In ACM Transactions on Graphics, vol. 23, Issue 3, Aug. 1, 2004, pp. 704-711.

"International Search Report and Written Opinion Issued in PCT Application No. PCT/US19/031907", dated Jul. 9, 2019, 10 Pages.

Ramamoorthi, et al., "A Signal-processing Framework for Inverse Rendering", In Proceedings of the 28th Annual Conference on Computer Graphics and Interactive Techniques, Aug. 1, 2001, pp. 117-128.

Romeiro, et al., "Blind Reflectometry", In Proceedings of the European Conference on Computer Vision, Sep. 5, 2010, pp. 45-58.

Shin, et al., "Estimation of Ambient Light and Transmission Map with Common Convolutional Architecture", In OCEANS 2016 MTS/IEEE Monterey, Sep. 19, 2016, 7 Pages.

Wu, et al., "High-quality Shape from Multi-view Stereo and Shading under General Illumination", In Proceedings of the Computer Vision and Pattern Recognition, Jun. 20, 2011, 8 Pages.

Wu, et al., "Interactive Relighting in Single Low-Dynamic Range Images", In ACM Transactions on Graphics, Apr. 7, 2017, 18 Pages.

Jakob, Wenzel, "Mitsuba Renderer", Retrieved From: https://www.mitsuba-renderer.org/download.html, 2010, 3 Pages Zhang, et al., "Colorful Image Colorization", In Proceedings of the European Conference on Computer Vision, Oct. 8, 2016, 29 Pages.

Zhang, et al., "Emptying, Refurnishing, and Relighting Indoor", In ACM Transactions on Graphics, vol. 35, Issue 6, Nov. 11, 2016, 14 Pages.

Yu, et al., "Inverse Global Illumination: Recovering Reflectance Models of Real Scenes from Photographs", In Proceedings of the 26th Annual Conference on Computer Graphics and Interactive Techniques, Jul. 1, 1999, pp. 215-227.

* cited by examiner

LIGHTING ESTIMATION USING AN INPUT IMAGE AND DEPTH MAP

CROSS-REFERENCE TO RELATED APPLICATION

This application is a U.S. National Stage Filing under 35 U.S.C. 371 of International Patent Application Serial No. PCT/US2019/031907, filed May 13, 2019, and published as WO 2019/226336 A1 on Nov. 28, 2019, which claims priority to Chinese Application No. 201810510214.1, filed May 24, 2018; which applications and publication are incorporated herein by reference in their entirety.

BACKGROUND

Synthesizing a three-dimensional virtual object into an image about a real scene is an important task in many applications, such as augmented reality, image editing, movie production and the like. In order to achieve a photorealistic effect, there arises a need of estimating a lighting condition of the real scene to enable the virtual object in the synthetic image to exhibit shading and shadow consistent with those of the real object in the scene, and to enable the synthetic image to correctly exhibit projection and/or occlusion between the virtual object and the real object. Recent advances of depth cameras allow the three-dimensional geometric structure of the real scene to be acquired easily. However, estimating the lighting condition of the scene from a single image about the real scene is still a challenging task.

SUMMARY

In accordance with implementations of the subject matter described herein, there is provided a solution of lighting estimation. In the solution, an input image about a real object and a depth map corresponding to the input image are obtained. A geometric structure of the scene in the input image is determined based on the depth map. Shading and shadow information on the real object caused by a light source in the scene is determined based on the determined geometric structure of the scene. Then, a lighting condition in the scene caused by the light source is determined based on the input image and the shading and shadow information.

The lighting estimation solution according to the subject matter described herein can progressively estimate a lighting condition in a scene using multiple levels of neural networks based on an input image and shading and shadow information on the input image, without making any assumptions on material properties of a real object in the scene. By modeling a light source in the scene with a linear combination of a set of canonical light bases, and utilizing a set of irradiance maps rendered from the set of canonical light bases as an input of the neural network, the solution can greatly simplify complexity of lighting estimation and improve accuracy of the result. Moreover, by utilizing multi-tree-based progressive estimation, this solution can reduce the training and computation cost of each level of neural network and improve the robustness thereof. The virtual object rendered using the lighting condition obtained according to the solution can exhibit a realistic effect consistent with the real object.

This Summary is provided to introduce a selection of concepts in a simplified form that are further described below in the Detailed Description. This Summary is not intended to identify key features or essential features of the claimed subject matter, nor is it intended to be used to limit the scope of the subject matter described herein.

BRIEF DESCRIPTION OF THE DRAWINGS

Throughout the drawings, the same or similar reference symbols represent the same or similar elements.

DETAILED DESCRIPTION OF EMBODIMENTS

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

EXAMPLE ENVIRONMENT

Figure 1:
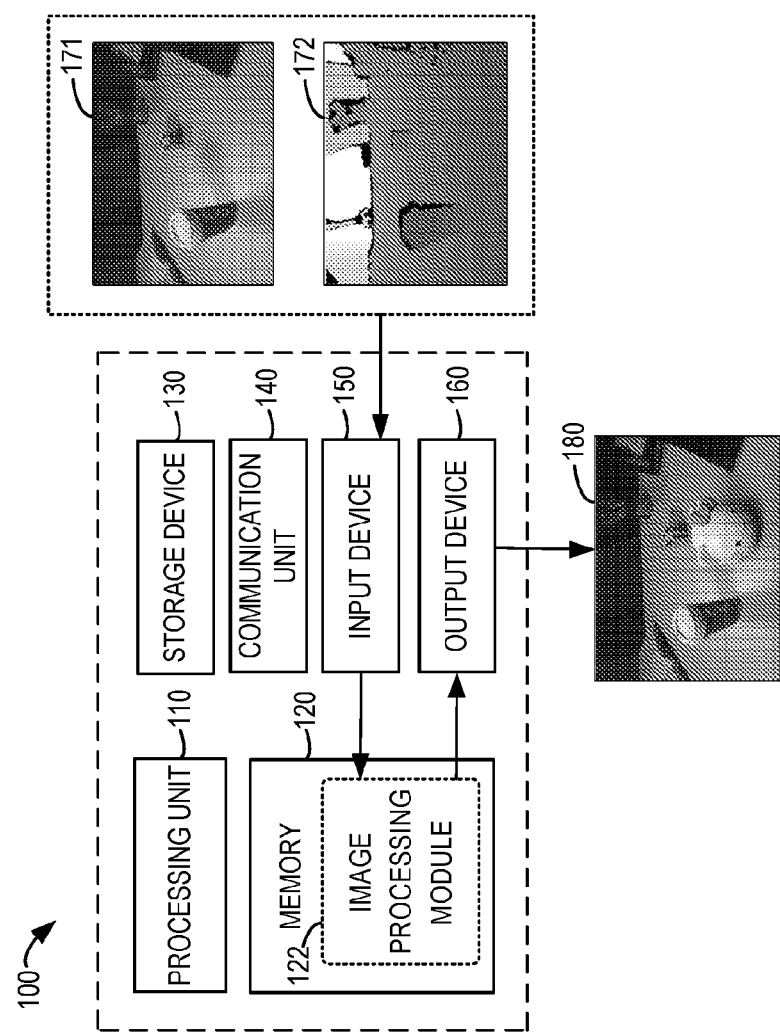
FIG. 1 illustrates a block diagram of a computing device 100 that can implement a plurality of implementations of the subject matter described herein.

Basic principles and various example implementations of the subject matter described herein will now be described with reference to the drawings. FIG. 1 illustrates a block diagram of a computing environment 100 in which implementations of the subject matter described herein can be implemented. It is to be understood that the computing device 100 as shown in FIG. 1 is merely exemplary, without suggesting any limitations to the function and scope of implementations of the subject matter described herein in any manners. As shown in FIG. 1, the computing device 100 includes a computing device 100 in form of a general computer device. Components of the computing device 100 include, but are not limited to, one or more processors or processing units 110, a memory 120, a storage device 130, one or more communication units 140, one or more input devices 150, and one or more output devices 160.

In some implementations, the computing device 100 can be implemented as various user terminals or service terminals having a computing capacity. The service terminals may be servers, large-scale computing devices and the like provided by various service providers. The user terminals are, for instance, any type of mobile terminal, fixed terminal, or portable terminal, including mobile phones, stations, units, devices, multimedia computers, multimedia tablets, Internet nodes, communicators, desktop computers, laptop computers, notebook computers, netbook computers, tablet computers, personal communication system (PCS) devices, personal navigation devices, personal digital assistants (PDA), audio/video players, digital cameras/video players, positioning devices, television receivers, radio broadcast receivers, electronic book devices, gaming devices or any combination thereof, including the accessories and peripherals of these devices, or any combination thereof. It may be further predicted that the computing device 100 can support any type of interface for the user (such as "wearable" circuitry, etc.).

The processing unit 110 may be a physical or virtual processor and can execute various processes based on the programs stored in the memory 120. In a multi-processor system, multiple processing units execute computer-executable instructions in parallel to improve the parallel processing capacity of the computing device 100. The processing unit 110 is also referred to as central processing unit (CPU), microprocessor, controller and microcontroller.

The computing device 100 typically includes a plurality of computer storage media, which can be any available media accessible by the computing device 100, including but not limited to volatile and non-volatile media, and removable and non-removable media. The memory 120 can be a volatile memory (for example, a register, cache, Random Access Memory (RAM)), non-volatile memory (for example, a Read-Only Memory (ROM), Electrically Erasable Programmable Read-Only Memory (EERPROM), flash memory), or any combination thereof. The memory 120 includes an image processing module 122 having program modules configured to perform functions of various implementations described herein. The image processing modules 122 can be accessed and operated by the processing unit 110, so as to implement respective functions.

The storage device 130 can be any removable or non-removable media and may include machine-readable media, which can be used for storing information and/or data and accessed in the computing device 100. The computing device 100 may further include additional removable/non-removable, volatile/non-volatile memory media. Although not shown in FIG. 1, a disk drive is provided for reading and writing a removable and non-volatile disk and a disc drive is provided for reading and writing a removable non-volatile disc. In such case, each drive is connected to the bus (not shown) via one or more data media interfaces.

The communication unit 140 communicates with a further computing device via communication media. Additionally, functions of components in the computing device 100 can be implemented by a single computing cluster or multiple computing machines connected communicatively for communication. Therefore, the computing device 100 can be operated in a networking environment using a logical link with one or more other servers, network personal computers (PCs) or another general network node.

The input device 150 may include one or more input devices, such as a mouse, keyboard, tracking ball, voice-input device, and the like. The output device 160 may include one or more output devices, such as a display, loudspeaker, printer, and the like. As required, the computing device 100 can also communicate via the communication unit 140 with one or more external devices (not shown) such as a storage device, display device and the like, one or more devices that enable users to interact with the computing device 100, or any devices that enable the computing device 100 to communicate with one or more other computing devices (for example, a network card, modem, and the like). Such communication is performed via an input/output (I/O) interface (not shown).

The computing device 100 can be used to implement lighting estimation in a plurality of implementations of the subject matter described herein. Hence, the computing device 100 is sometimes referred to as "an image processing device 100" hereinafter. When performing lighting estimation, the image processing device 100 may receive, via an input device 150, an input image 171 about a real object (for example, a coffee cup, magic cube and the like) and a depth map 172 corresponding to the input image 171. For example, the depth map 172 can be captured by a depth camera. Then, the image processing device 100 may determine a lighting condition of a scene in the input image 171 using a plurality of trained neural networks based on the input image 171 and the depth map 172. For example, the lighting condition may be represented by an image (not shown) of a particular shape, the image representing a light source in the scene. The image may include a plurality of pixels corresponding to a plurality of portions of the light source, and respective pixel values of the plurality of pixels represent respective irradiance intensities of the plurality of portions of the light source. Moreover, the image processing device 100 may further synthesize a virtual object (for example, a Hello Kitty doll) into the scene of the input image 171 based on the determined lighting condition of the scene, so as to generate an output image 173. The virtual object in the output image 173 can exhibit a realistic effect consistent with the real object. The image processing device 100 may further output the image 173 via an output device 160.

Some legacy solutions also attempt to recover the lighting condition in the scene from the image about the real scene. However, these legacy solutions are typically applicable to a remote-view image including some or all environment information, but not suitable for a quite common close-view image in a plurality of applications (i.e., only the real object is presented in the image, while the environment information leading to the lighting effect of the object is barely visible). For a close-view image, some other legacy solutions propose to recover the lighting condition of the real scene from shading information of the real object. However, these solutions typically require that the material of the object or the reflection of the object surface is known. These solutions cannot recover the lighting condition of the real scene based on an image about an object with an arbitrary material or surface reflection.

Some problems in the existing lighting estimation solutions have been discussed above. According to implementations of the subject matter described herein, there is provided a solution of lighting estimation for solving the above problem and one or more of other potential problems. The solution enables progressive estimation of a lighting condition in a scene using multiple levels of neural networks based on shading and shadow information of an input image. Hence, the solution is applicable to both remote-view images and close-view images, without making any assumptions on material properties of the real object in the scene. By modeling the light source in the scene with a linear combination of a set of canonical light bases, and utilizing a set of irradiance maps rendered from the set of canonical light bases as an input of the neural networks, the solution can significantly simplify complexity of the lighting estimation and enhance accuracy of the result. In addition, by utilizing a multi-tree-based progressive estimation, the solution can reduce the training and computing cost of each level of neural network and improve its robustness. The virtual object rendered using the result of the light estimation according to the solution can exhibit a shading and shadow effect consistent with the real object.

Various example implementations of the solution will be further described below in detail with reference to the drawings.

System Architecture

Figure 2:
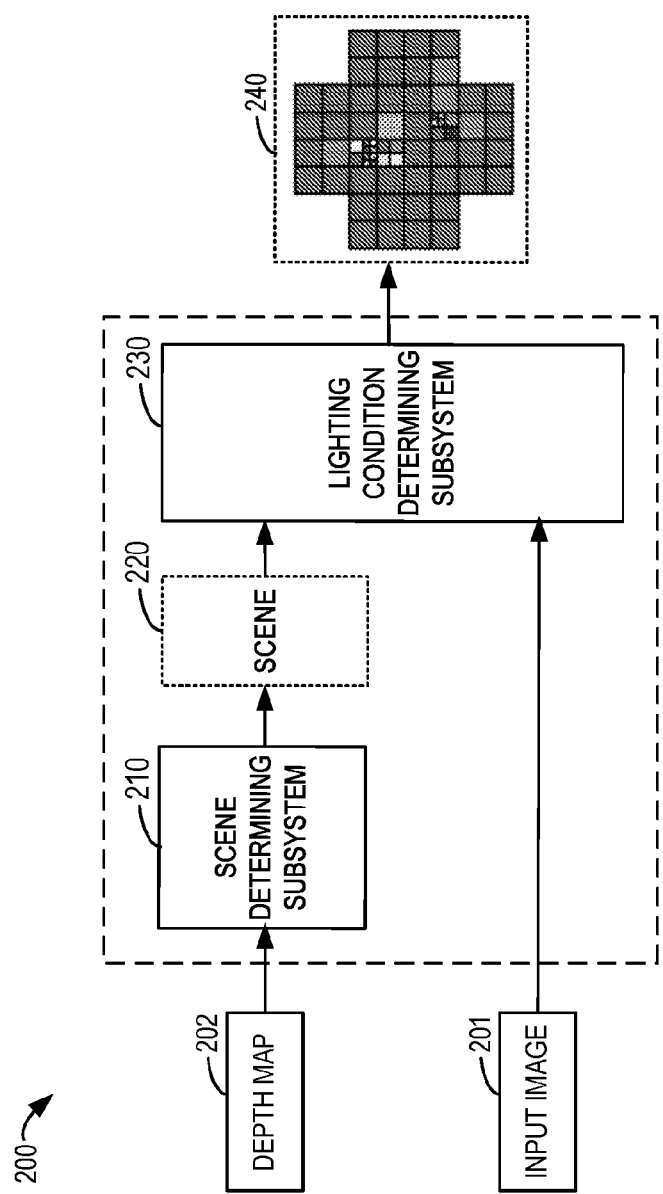
FIG. 2 illustrates a system 200 for lighting estimation according to some implementations of the subject matter described herein.

FIG. 2 illustrates a block diagram of a system 200 for lighting estimation according to some implementations of the subject matter described herein. In some implementations, the system 200 can be implemented as at least a part of the image processing module 122 of the computing device 100 in FIG. 1, i.e., it can be implemented as a computer program module. Alternatively, in other implementations, the system 200 can be completely or partially implemented by hardware devices. As shown in FIG. 2, the system 200 may generally include a scene determining sub-system 210 and a lighting determining sub-system 220. It is to be understood that the structure and functionality of the system 200 are only described herein for the purpose of illustration, without suggesting any limitation to the scope of the subject matter described herein. The implementations of the subject matter described herein can be embodied in different structures and/or functionalities.

As shown in FIG. 2, an input of the system 200 can be an input image 201 about a real object placed on a flat surface (for example, the input image 201 can be an input image 171 as shown in FIG. 1) and a depth map 202 corresponding to the input image 201 (for example, the depth map 202 can be the depth map 172 as shown in FIG. 1). The input image 201 may be of any size and/or format, for example. In some implementations, the input image 201 may be a common RGB three-channel image. The depth map 202 may be captured by a depth camera, and a value of each pixel reflects an actual distance between the depth camera and a point in the real scene corresponding to the pixel. Besides, the depth map 202 can be aligned with the input image 201. That is, the pixels in the depth map 202 are in a one-to-one correspondence with the pixels in the input image 201. In some implementations, the depths denoted by the values of pixels in the depth map 202 may be not accurate, as long as the depth map 202 can represent a rough geometric structure of the real scene.

The scene determining subsystem 210 can determine the real scene 220 in the input image 201 based on the depth map 202.

In some implementations, in order to determine the real scene 220 in the input image 201, the scene determining subsystem 210 may first determine a coordinate system describing the real scene. For example, the scene determining subsystem 210 may define the flat surface for placement of the real object as the XY plane in the coordinate system of the real scene, while the normal of the XY plane acting as the Z axis in the coordinate system of the real scene.

In some implementations, in order to determine the real scene in the input image 201, the scene determining subsystem 210 may first convert the depth map 202 into a point cloud in the coordinate system. Then, the scene determining subsystem 210 may fit a plurality of points representing the flat surface for placement of the real object in the point cloud into a plane. In some implementations, for a scene including a plurality of planes, the scene determining subsystem 210 may use the largest one among the plurality of planes as the plane for placement of the real object. After fitting the plurality of points of the flat surface for placement of the real object in the point cloud into the plane, the scene determining subsystem 210 may remove the plurality of points representing the flat surface. After fitting into the plurality of points representing the flat surface for placement of the real object into the plane, the scene determining subsystem 210 may further reconstruct a plurality of points in the point cloud located above the fitted plane into a 3-dimensional (3D) mesh. For example, the scene determining subsystem 210 may reconstruct a plurality of points in the point cloud located above the fitted plane into a 3-dimensional (3D) mesh through Poisson surface reconstruction. The fitted plane and the rebuilt 3D mesh can represent the scene 220 in the input image 201 jointly.

The scene 220 and the input image 201 determined by the scene determining subsystem 210 can be input to the lighting condition determining subsystem 230 for lighting estimation of the scene. In some implementations, in order to estimate the light condition in the scene 220, the light condition determining subsystem 230 may model an environment light source in the scene 220.

In some implementations, the lighting condition determining subsystem 230 may model the environment light source in the scene 220 using a cube centered at the origin of the coordinate system and aligned with the axes of the coordinate system described above. An image of a cross shape can be obtained by expanding the cube. Hence, the environment light source in the scene 220 can be represented by the image of a cross image. In some other implementations, the lighting condition determining subsystem 230 may model the environment light source in the scene 220 using a 3-dimensional shape, such as a spherical or other shape. Correspondingly, the environment light source in the scene 220 can be represented by an image of another shape corresponding to the 3-dimensional shape, such as a spherical or other shape. For ease of description, in this context, the cross image (for example, as shown by the cross image 240 in FIG. 2) serves as an example of the representation of the environment light source in the scene 200. It is to be understood that this is provided only for the purpose of illustration, without suggesting any limitation to the scope of the subject matter described herein. The subject matter described herein can model the environment light source in the scene using other representations.

In some implementations, the cross image 240 representing the light source may include a plurality of pixels which correspond to a plurality of portions of the environment light source in the scene 220, respectively. For example, respective pixel values of the plurality of pixels may represent respective irradiance intensities of the plurality of portions of the environment light source in the scene 220, respectively. In the context, each pixel in the image 240 representing the environment light source in the scene 240 is also referred to as "a canonical light base," and the image 240 representing the environment light source in the scene 220 is also referred to as "an environment map." In some implementations, the lighting condition determining subsystem 230 can determine respective pixel values of the plurality of pixels in the environment map 240 based on the scene 220 and the input image 201, thereby determining the lighting condition in the scene 220.

The structure and the working principle of the lighting condition determining subsystem 230 will be described below in detail with reference to FIG. 3.

Working Principle

Figure 3:
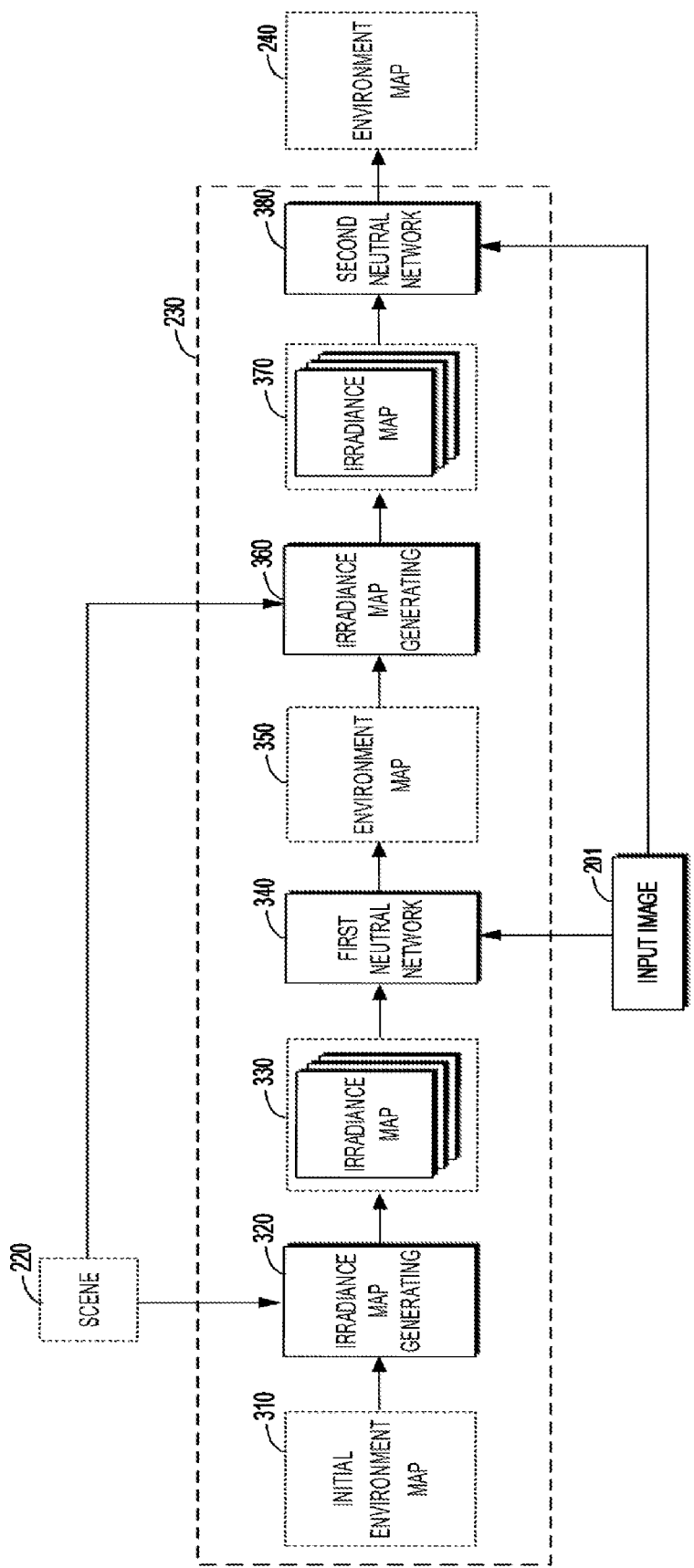
FIG. 3 illustrates a diagram of a lighting condition determining subsystem in the system 200 according to some implementations of the subject matter described herein.

FIG. 3 illustrates a block diagram of the lighting condition determining subsystem 230 according to some implementations of the subject matter described herein. As shown in FIG. 3, the lighting condition determining subsystem 230 may generally include a irradiance map generating module 320, a first neural network 340, an irradiance map generating module 360 and a second neural network 350. It is to be understood that the structure and functionality of the lighting condition determining subsystem 230 is provided only for the purpose of illustration, without suggesting any limitation to the scope of the subject matter described herein. The implementations of the subject matter described herein can be embodied in different structures and/or functionalities.

As described above, the lighting condition determining subsystem 230 can represent the environment light source in the scene 220 as an image of a particular shape. In the context, a cross image with a resolution of 4×4×3 pixels is used as an example of the representation of the environment light source. However, it is to be understood that this is provided only as an example, without suggesting any limitation to the scope of the subject matter described herein. In some implementations, the lighting condition determining subsystem 230 may initialize values of 4×4×3 pixels in the cross image (i.e., an initial environment map 310) representing the environment light source in the scene 220 with a predetermined value. For example, the value of each of the pixels in the initial environment map 310 can be initialized with the normalized irradiance intensity "1."

Irradiance Map Generation

In some implementations, the irradiance map generating module 320 may determine, based on the scene 220, shading and shadow information on the real object in the input image 201 caused by the light source in the scene 220. Specifically, the irradiance map generating module 320 may generate a first set of irradiance maps 330 corresponding to the plurality of pixels in the initial environment map 310 based on the scene 220 and the initial environment map 310. The "irradiance map" described herein records a radiant flux of the light source for each of the pixels in the input image, which can reflect the shading and shadow information of the input image caused by the light source. For example, each of the first set of irradiance maps may have the same size as the input image 201 and represent the shading and shadow information on the real object in the input image 201 caused by respective portions of the light source.

In some implementations, given a certain point L on the light source (for example, a pixel in the cross image representing the light source), an irradiance map corresponding thereto can record a radiant flux of the point L for each of pixels in the input image 201. For example, for a pixel x in the input image 201, the radiant flux caused by the point L on the light source can be represented as follows:

$$r(x)=V(x,l)L(l)(N(x)\cdot l) \quad (1)$$

where N(x) represents a normal direction at the pixel x, l represents a lighting direction from the point L on the light source to the pixel x, L(l) represents an irradiance intensity along the direction l, and V(x, l) represents the visibility of the pixel x to the point L on the light source along the direction l. Similarly, for a combination of a plurality of points on the given light source, the radiant flux caused by the combination of the plurality of points can be determined by integrating the equation (1). For example, for a pixel x in the input image 201, the radiant flux caused the combination of the plurality of points (for example, which is denoted as "Ω+") on the light source can be represented as follows:

$$R(x)=\int_{\Omega+} V(x,l)L(l)(N(x)\cdot l)dl \quad (2)$$

Based on the equation (1), the irradiance map generating module 320 can generate for a pixel in the initial environment map 310 (i.e., a point of the environment light source in the scene 220), an irradiation map corresponding thereto. In this way, the irradiance map generating module 320 can generate a first set of irradiance maps 330 having a one-to-one correspondence with a plurality of pixels in the initial environment map 310.

Initialization Network

As shown in FIG. 3, the first set of irradiance maps 330 and the input image 201 can be input to a first trained neural network 340 (which is also referred to as "an initialization network" herein). For example, the first neural network 340 may be a convolution neural network (CNN), which can be trained to determine respective pixel values of the plurality of pixels in the initial environment map 310 and thus generate an environment map 350 corresponding to the environment map 310. Lighting estimation is performed by providing an irradiance map representing the shading and shadow information in the input image to the neural network, such that implementations of the subject matter described herein are applicable to both a remote-view image and a close-view image, without requiring any assumptions on the material properties of the real object in the scene. Although CNN is provided herein as an example of the first neural network 340, it is to be understood that the implementations of the subject matter described herein are applicable to other types of neural networks, and the scope of the subject matter described herein is not limited in this aspect.

Figure 4:
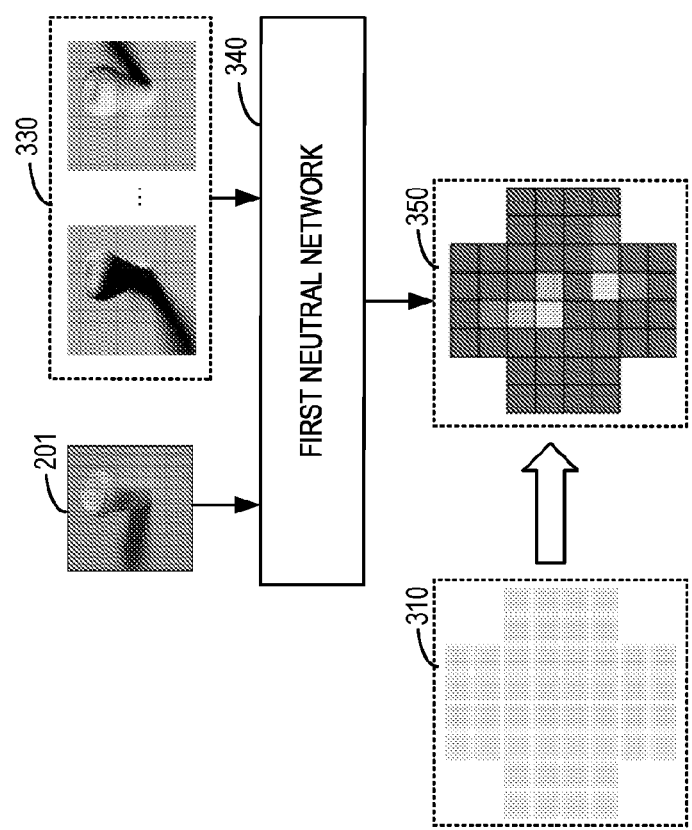
FIG. 4 illustrates an operation diagram of an initialization network for lighting estimation according to some implementations of the subject matter described herein.

FIG. 4 is an operation diagram of the initialization network 340 for lighting estimation according to some implementations of the subject matter described herein. FIG. 4 illustrates the input image 201 and the first set of irradiance maps 330 generated based on the initial environment network 310. As shown in FIG. 4, the initialization network 340 can determine respective pixel values of the plurality of pixels in the initialization environment 310 based on the input image 201 and the first set of irradiance maps 330 and thus generate an environment map 350 corresponding to the environment map 310.

In some implementations, inside the initialization network 340, the input image 201 may be processed by a three-layered encoder, and each irradiance map 330 may be processed separately by another two-layered encoder. The encoder for each irradiance map 330 can share the same structure and weights. Each layer of the encoder may include a convolution layer, a batch normalization layer and an excitation layer (for example, using a rectified linear unit (ReLU) as an activation function), and then may be down-sampled to the next scale by a max pooling layer. After passing through the encoders, feature maps extracted from each irradiance map 330 and the input image 201 are concatenated and then processed by another three-layered encoder. Finally, respective pixel values of the plurality of pixels in the initial environment map 310 can be obtained from a fully-connected (FC) layer followed by the three-layered encoder. These pixel values can be organized into the environment map 350 corresponding to the environment map 310.

In some implementations, a constructed training dataset can be used to train the initialization network 340. For example, a 3D object and an environment map randomly selected from a group of 3D objects and environment maps can be used to render and generate an image. Then, the rendered image and the environment map applied during the rendering can be collected into the training dataset of the initialization network 340. During the training procedure of the initialization network 340, for example, an L2 loss function can be used to measure a difference between the training data and a predicted result.

Returning to FIG. 3, by generating the environment map 350, the lighting condition determining subsystem 230 can determine the lighting condition in the scene 220 preliminarily. However, due to diversity of shapes and layouts of the object in the scene, the mapping between the lighting condition in the scene and the input image 201 and the depth map 202 may be non-linear. In order to solve the problem, the lighting condition determining subsystem 230 can further refine the pixels in the determined environment map 350, so as to determine the lighting condition in the scene 220 more accurately.

Refinement Network

In some implementations, the lighting condition determining subsystem 230 can refine each pixel in the environment map 350 into a plurality of sub-pixels and estimate the lighting condition in the scene 220 more accurately by determining respective values of the plurality of refined sub-pixels. For example, in some implementations, the lighting condition determining subsystem 230 can refine the pixel in the environment map 350 based on a quadtree. That is, the lighting condition determining subsystem 230 can refine each pixel in the environment map 350 into 4 sub-pixels and determine values of the four sub-pixels correspondingly. In some other implementations, the lighting condition determining subsystem 230 can also divide the pixel in the environment map 350 in other manners. For example, each pixel can be divided into 9 sub-pixels, 16 sub-pixels or the like.

As shown in FIG. 3, in some implementations, in order to determine the lighting condition in the scene 200 more accurately, the environment map 350 and the scene 220 may be input to the irradiance map generating module 360. In some implementations, for a pixel in the environment map 350 (for example, the pixel with an irradiance intensity which is not zero), the irradiance map generating module 360 may generate a second set of irradiance maps 370 associated with the pixel. The second set of irradiance maps 370 and the input image 201 can be input to a second trained neural network 380 (which is also referred to as "a refinement network" herein). For example, the second neural network 380 may be a convolution neural network (CNN), which can be trained to determine whether a pixel in the environment map 350 should be divided into a plurality of sub-pixels based on the second set of irradiance maps 370 and the input image 201, and to determine respective values of the plurality of sub-pixels. In this way, the lighting condition determining subsystem 230 can generate the refined environment map 240 corresponding to the environment map 350. Although the CNN is provided herein as an example of the second neural network 380, it is to be understood that the implementations of the subject matter described herein are applicable to other types of neural networks, and the scope of the subject matter described herein is not limited in this aspect.

It is assumed that $L^2$ is used to represent the environment map 350 with a resolution of 4×4×3 pixels, and $L^3$ is used to represent the environment map 240 (for example, the resolution of which is 8×8×3 pixels) obtained by refining the environment map 350 based on a quadtree. Assumed that the pixel located in the $u^{th}$ column and $v^{th}$ line in the environment map 350 can be represented as $L^2(u,v)$, the four sub-pixels corresponding to the pixel in the environment map 240 can be represented as follows: $L^3(2u,2v)$, $L^3(2u+1,2v)$, $L^3(2u,2v+1)$ and $L^3(2u+1,2v+1)$.

In some implementations, in order to determine the lighting condition in the scene 220 as accurately as possible, for the pixel $L^2(u,v)$ in the environment map 350, the irradiance map generating module 360 may generate respective irradiance maps for all of the pixels in the environment map 240 at the next finer level, as an input of the refinement network 380. However, this manner probably results in a significant increase of the number of the irradiance maps and a remarkable growth in the computation and storage cost related to the refinement network 380.

In order to solve the problem, in some implementations, for the pixel $L^2(u,v)$ in the environment map 350, the irradiance map generating module 360 may generate a predetermined number of irradiance maps as an input of the refinement network 380. For example, for the pixel $L^2(u,v)$ in the environment map 350, the irradiance map generating module 360 may generate 13 irradiance maps associated with the pixel $L^2(u,v)$. For example, the 13 irradiance maps may include: 4 irradiance maps corresponding to 4 sub-pixels $L^3(2u,2v)$, $L^3(2u+1,2v)$, $L^3(2u,2v+1)$ and $L^3(2u+1,2v+1)$ divided from the pixel $L^2(u,v)$; 8 irradiance maps corresponding to 8 pixels (i.e., $L^2(u-1,v-1)$, $L^2(u-1,v)$, $L^2(u-1,v+1)$, $L^2(u,v-1)$, $L^2(u,v+1)$, $L^2(u+1,v-1)$, $L^2(u+1,v)$ and $L^2(u+1,v+1)$) adjacent the pixel $L^2(u,v)$; and an irradiance map corresponding to a combination of remaining pixels other than the pixel $L^2(u,v)$ and the adjacent 8 pixels in the environment map 350.

The second set of irradiance map 370 may be generated based on the equation (1) or (2) as discussed above. Specifically, the irradiance map generating module 360 may generate, based on the equation (1) as described above, 4 irradiance maps corresponding to the 4 subpixels $L^3(2u,2v)$, $L^3(2u+1,2v)$, $L^3(2u,2v+1)$ and $L^3(2u+1,2v+1)$ divided from the pixel $L^2(u,v)$ respectively. Likewise, the irradiance map generating module 360 may generate, based on the above equation (1), 8 irradiance maps corresponding to 8 pixels (i.e., $L^2(u-1,v-1)$, $L^2(u-1,v)$, $L^2(u-1,v+1)$, $L^2(u,v-1)$, $L^2(u,v+1)$, $L^2(u+1,v-1)$, $L^2(u+1,v)$ and $L^2(u+1,v+1)$) adjacent the pixel $L^2(u,v)$ respectively. In addition, the irradiance map generating module 360 may generate, based on the above equation (2), an irradiance map corresponding to a combination of remaining pixels other than the pixel $L^2(u,v)$ and the adjacent 8 pixels in the environment map 350. The above-mentioned 13 irradiance maps can act as an input of the refinement network 380, so as to be used for generating the refined environment map 240.

Figure 5:
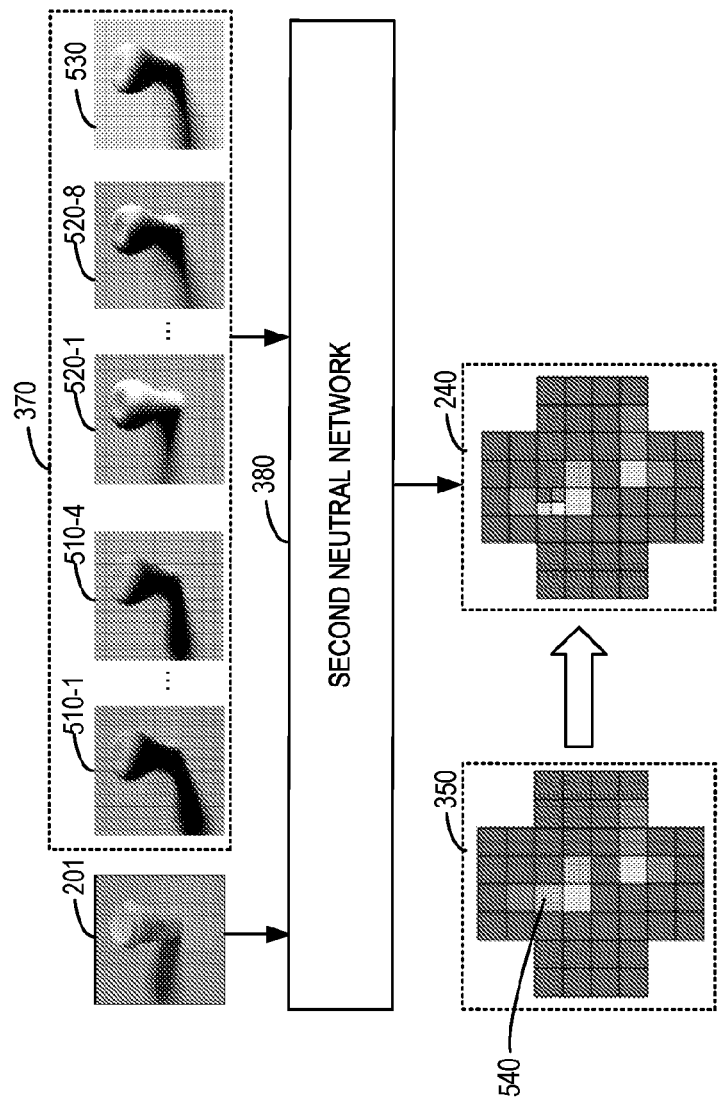
FIG. 5 illustrates an operation diagram of a refinement network for lighting estimation according to some implementations of the subject matter described herein.

FIG. 5 illustrates an operation diagram of the refinement network 380 for lighting estimation according to some implementations of the subject matter described herein. FIG. 5 illustrates the input image 201 and the second set of irradiance maps 370 generated from a pixel 540 (which is also referred to as "a first pixel" herein) in the environment map 350. As shown in FIG. 5, in some implementations, the second set of irradiance maps 370 generated by the irradiance map generating module 360 as shown in FIG. 3 may include 4 irradiance maps 510-1 ... 510-4 corresponding to 4 sub-pixels divided from the pixel 540, 8 irradiance maps 520-1 ... 520-8 corresponding to 8 pixels adjacent the pixel 540, and an irradiance map 530 corresponding to a combination of remaining pixels other than the pixel 540 and the 8 adjacent pixels in the environment 350. The refinement network 380 may determine, based on the second set of irradiance maps 370 and the input image 201, whether the pixel 540 is to be divided. If the refinement network 380 determines that the pixel 540 is to be divided, the refinement network 380 may further determine respective values of the 4 sub-pixels divided from the pixel 540. In this manner, the refined environment map 240 corresponding to the environment map 350 can be generated.

In some implementations, the internal structure of the refinement network 380 may be similar to that of the initialization network 340. Specifically, the input image 201 and each irradiance map 370 may be processed by different encoders separately. After the second set of irradiance maps 370 and the input image 201 are processed by the separate encoders, the extracted features can be concatenated and fed into another three-layered encoder. Finally, the output result (i.e., whether a pixel is to be divided and respective values of the sub-pixels divided from the pixel) can be obtained from a fully-connected (FC) layer following the three-layered encoder. Particularly, in the refinement network 380, 4 encoders for the 4 irradiance maps 510-1 . . . 510-4 can share weights. Similarly, 8 encoders for the 8 irradiance maps 520-1 . . . 520-8 can share weights. Regarding the decision on whether a pixel is to be divided, the refinement network 380 can output a probability that it is to be divided and a probability that it is not to be divided. A soft-max layer may then convert them into a final decision. For the values of the four sub-pixels, there may be a stronger contrast among their irradiance intensities. In some implementations, a range of output values can be divided uniformly into a plurality of intervals, and the value of each sub-pixel can be output with a discretized multinomial classification.

In some implementations, the refinement network 380 can be trained using a constructed dataset. For example, an image can be rendered using a 3D object and a lighting condition selected randomly from a set of 3D objects and lighting conditions. For each lighting condition selected randomly, a predefined policy can be used to determine its optimum cross image representation. Thereafter, the refinement network 380 can be trained to approximate the mapping from the input image to the optimum cross image representation. In some implementations, for example, a cross-entropy loss function can be used to train the refinement network 380 for both the dividing decision and the sub-pixel values.

Although FIG. 3 only shows an example of a lighting condition determining subsystem 230 having two levels of neural networks (i.e., the initialization network 340 and the refinement network 380), it is to be understood that the implementations of the subject matter described herein are applicable to estimation of the lighting condition using fewer or more levels of neural networks. For example, in some implementations, only one level of neural network (for example, an initialization network 340) can be used in order to reduce the computation cost. Alternatively, in some other implementations, more levels of refinement networks (for example, two or more levels of refinement networks) can be used in order to obtain a more accurate result.

Figure 6:
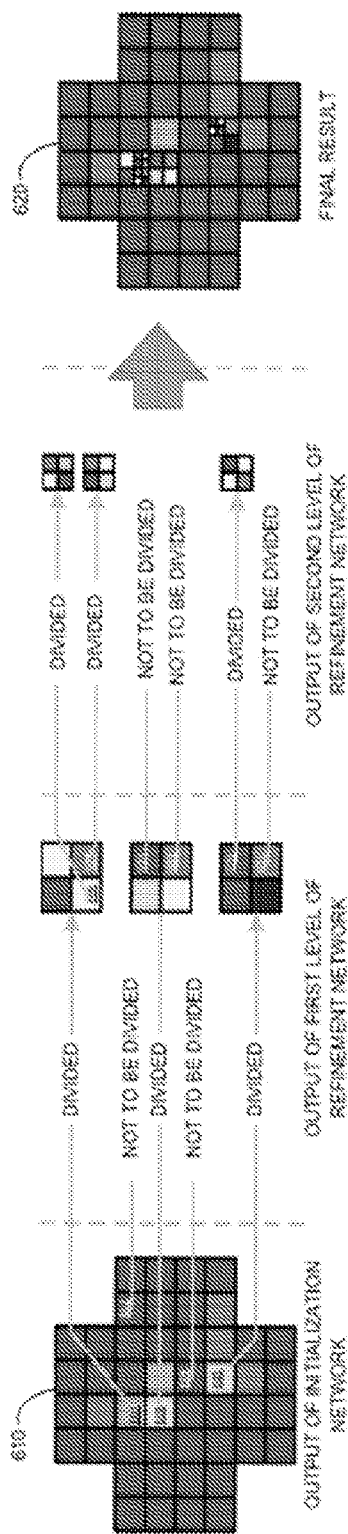
FIG. 6 illustrates a diagram of determining progressively a lighting condition in a scene using multiple levels of neural networks according to some implementations of the subject matter described herein.

FIG. 6 illustrates a diagram of determining progressively a lighting condition in a scene using multiple levels of neural networks (for example, an initialization network and two levels of refinement networks) according to some implementations of the subject matter described herein. FIG. 6 illustrates an environment map 610 determined by an initialization network. A first level of refinement network determines, for each of pixels 601, 602 . . . 605 in the environment map 610, whether the pixel is to be further divided, and determines, for each of the pixels 601, 603 and 605 that are determined to be divided, respective values of 4 sub-pixels divided from the pixel. A second level of refinement network determines, for each of pixels 606, 607 . . . 611 in the environment map output from the first level of refinement network, whether the pixel is to be further divided, and determines, for each of the pixels 606, 607 and 610 that are determined to be divided, respective values of 4 sub-pixels divided from the pixel. In this manner, a final environment map 620 (for example, which is of a resolution of 16×16×3 pixels) can be obtained.

The lighting estimation solution according to implementations of the subject matter described herein has been described above. From the above description, it is seen that the lighting estimation solution according to the subject matter described herein can progressively estimate a lighting condition in a scene using multiple levels of neural networks based on an input image and shading and shadow information on the input image, without making any assumptions on material properties of a real object in the scene. By modeling a light source in the scene with a linear combination of a set of canonical light bases, and utilizing a set of irradiance maps rendered from the set of canonical light bases as an input of the neural network, the solution can greatly simplify complexity of lighting estimation and improve accuracy of the result. Moreover, by utilizing multi-tree-based progressive estimation, this solution can reduce the training and computation cost of each level of neural network and improve the robustness thereof. The virtual object rendered using the lighting condition obtained according to the solution can exhibit a realistic effect consistent with the real object.

Example Process

Figure 7:
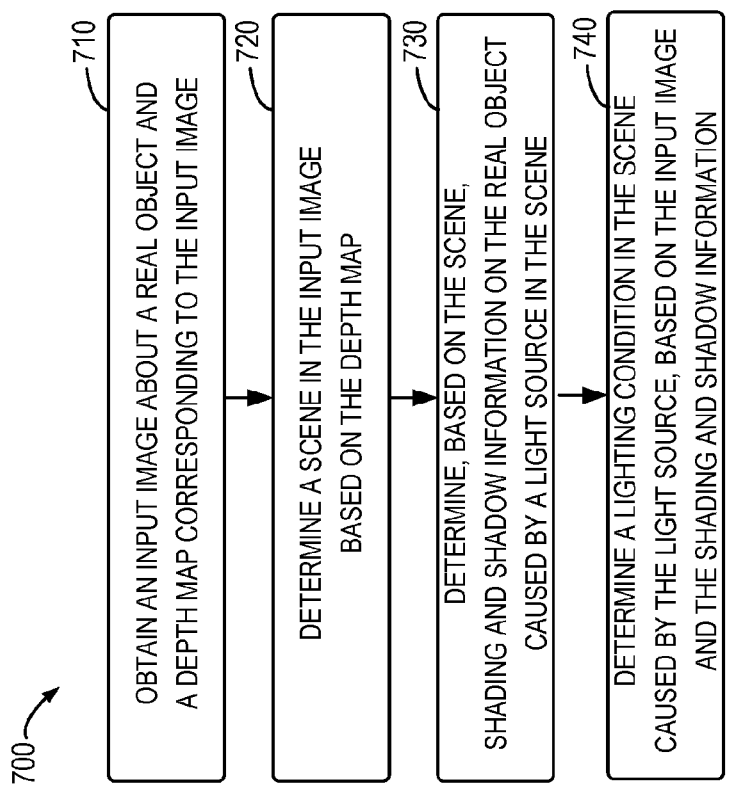
FIG. 7 illustrates a flowchart of a process for lighting estimation according to some implementations of the subject matter described herein.

FIG. 7 illustrates a flowchart of a process 700 for lighting estimation according to some implementations of the subject matter described herein. The process 700 can be implemented, for example, by the image processing module 122 as shown in FIG. 1. It is to be understood that, the process 700 can further include additional blocks not shown and/or omit the shown blocks. The scope of the subject matter described herein is not limited in this aspect.

At block 710, the image processing module 122 obtains an input image about a real object and a depth map corresponding to the input image.

At block 720, the image processing module 122 determines a scene in the input image based on the depth map.

At block 730, the image processing module 122 determines, based on the scene, shading and shadow information on the real object caused by a light source in the scene.

At block 740, the image processing module 122 determines a lighting condition in the scene caused by the light source based on the input image and the shading and shadow information.

In some implementations, the process 700 further comprises: generating, based on the scene and the lighting condition, an output image comprising the real object and a virtual object, the output image synthesizing the virtual object into the scene of the input image.

In some implementations, the scene comprises a surface for placement of the real object. Determining the scene comprises: converting the depth map into a point cloud; fitting a plurality of points in the point cloud into a plane, the plurality of points representing the surface; and reconstructing a plurality of points in the point cloud located above the plane into a three-dimensional mesh, the plane and the three-dimensional mesh jointly representing the scene in the input image.

In some implementations, the light source is represented by an image of a predetermined shape, the image comprises a plurality of pixels corresponding to a plurality of portions of the light source, and respective pixel values of the plurality of pixels represent respective irradiance intensities of the plurality of portions of the light sources. In some implementations, determining the shading and shadow information comprises: initializing respective pixel values of the plurality of pixels in the image with a predetermined value; and generating a first set of irradiance maps corresponding to the plurality of pixels based on the scene and the initialized image, wherein each of the irradiance maps represents corresponding shading and shadow information on the real object caused by a corresponding portion of the light source. In some implementations, determining the lighting condition in the scene includes: determining, based on the input image and the first set of irradiance maps, respective pixel values of the plurality of pixels in the image.

In some implementations, the image representing the light source is an image of a cross shape.

In some implementations, determining respective pixel values of the plurality of pixels in the image includes: determining, based on the input image and the first set of irradiance maps, respective pixel values of the plurality of pixels in the image using a trained neural network.

In some implementations, determining respective pixel values of the plurality of pixels in the image includes: determining, based on the input image and the first set of irradiance maps, respective pixel values of the plurality of pixels in the image progressively using a plurality of trained neural networks.

In some implementations, the plurality of trained neural networks comprise at least a first neural network and a second neural network. Determining respective pixel values of the plurality of pixels in the image comprises: determining, based on the input image and the first set of irradiance maps, a first pixel value of a first pixel in the plurality of pixels and pixel values of at least one pixel adjacent the first pixel using the first neural network; generating a second set of irradiance maps based on the first pixel, the at least one pixel and the scene, the second set of irradiance maps corresponding to a plurality of sub-pixels of the first pixel, the at least one pixel and a combination of pixels other than the first pixel and the at least one pixel among the plurality of pixels respectively; determining, based on the input image and the second set of irradiance maps, whether the first pixel is to be divided using the second neural network; and in response to determining that the first pixel is not to be divided, using the first pixel value as a final pixel value of the first pixel.

In some implementations, determining respective pixel values of the plurality of pixels in the image further comprises: in response to determining that the first pixel is to be divided, dividing the first pixel into the plurality of sub-pixels; and determining respective sub-pixel values of the plurality of sub-pixels.

Example Implementations

Some example implementations of the subject matter described herein will be listed below.

In a first aspect, the subject matter described herein provides an electronic device comprising: a processing unit; and a memory coupled to the processing unit and storing instructions for execution by the processing unit. The instructions, when executed by the processing unit, cause the device to perform acts comprising: obtaining an input image about a real object and a depth map corresponding to the input image; determining a scene in the input image based on the depth map; determining, based on the scene, shading and shadow information on the real object caused by a light source in the scene; and determining a lighting condition in the scene caused by the light source based on the input image and the shading and shadow information.

In some implementations, the acts further comprise: generating, based on the scene and the lighting condition, an output image comprising the real object and a virtual object, the output image synthesizing the virtual object into the scene of the input image.

In some implementations, the scene comprises a surface for placement of the real object. Determining the scene comprises: converting the depth map into a point cloud; fitting a plurality of points in the point cloud into a plane, the plurality of points representing the surface; and reconstructing a plurality of points in the point cloud located above the plane into a three-dimensional mesh, the plane and the three-dimensional mesh jointly representing the scene in the input image.

In some implementations, the light source is represented by an image of a predetermined shape, the image comprises a plurality of pixels corresponding to a plurality of portions of the light source, and respective pixel values of the plurality of pixels represent respective irradiance intensities of the plurality of portions of the light source. In some implementations, determining the shading and shadow information comprises: initializing respective pixel values of the plurality of pixels in the image with a predetermined value; and generating a first set of irradiance maps corresponding to the plurality of pixels based on the scene and the initialized image, wherein each of the irradiance maps represents corresponding shading and shadow information on the real object caused by a corresponding portion of the light source. In some implementations, determining the lighting condition in the scene comprises: determining, based on the input image and the first set of irradiance maps, respective pixel values of the plurality of pixels in the image.

In some implementations, the image representing the light source is an image of a cross shape.

In some implementations, determining respective pixel values of the plurality of pixels in the image comprises: determining, based on the input image and the first set of irradiance maps, respective pixel values of the plurality of pixels in the image using a trained neural network.

In some implementations, determining respective pixel values of the plurality of pixels in the image comprises: determining, based on the input image and the first set of irradiance maps, respective pixel values of the plurality of pixels in the image progressively using a plurality of trained neural networks.

In some implementations, the plurality of trained neural networks comprise at least a first neural network and a second neural network. Determining respective pixel values of the plurality of pixels in the image comprises: determining, based on the input image and the first set of irradiance maps, a first pixel value of a first pixel in the plurality of pixels and pixel values of at least one pixel adjacent the first pixel using the first neural network; generating a second set of irradiance maps based on the first pixel, the at least one pixel and the scene, the second set of irradiance maps corresponding to a plurality of sub-pixels of the first pixel, the at least one pixel and a combination of pixels other than the first pixel and the at least one pixel among the plurality of pixels respectively; determining, based on the input image and the second set of irradiance maps, whether the first pixel is to be divided using the second neural network; and in response to determining that the first pixel is not to be divided, using the first pixel value as a final pixel value of the first pixel.

In some implementations, determining respective pixel values of the plurality of pixels in the image further comprises: in response to determining that the first pixel is to be divided, dividing the first pixel into the plurality of sub-pixels; and determining respective sub-pixel values of the plurality of sub-pixels.

In a second aspect, the subject matter described herein provides a computer-implemented method. The method comprises: obtaining an input image about a real object and a depth map corresponding to the input image; determining a scene in the input image based on the depth map; determining, based on the scene, shading and shadow information on the real object caused by a light source in the scene; and determining a lighting condition in the scene caused by the light source based on the input image and the shading and shadow information.

In some implementations, the method further comprises: generating, based on the scene and the lighting condition, an output image comprising the real object and a virtual object, the output image synthesizing the virtual object into the scene of the input image.

In some implementations, the scene comprises a surface for placement of the real object. Determining the scene comprises: converting the depth map into a point cloud; fitting a plurality of points in the point cloud into a plane, the plurality of points representing the surface; and reconstructing a plurality of points in the point cloud located above the plane into a three-dimensional mesh, the plane and the three-dimensional mesh jointly representing the scene in the input image.

In some implementations, the light source is represented by an image of a predetermined shape, the image comprises a plurality of pixels corresponding to a plurality of portions of the light source, and respective pixel values of the plurality of pixels represent respective irradiance intensities of the plurality of portions of the light source. In some implementations, determining the shading and shadow information comprises: initializing respective pixel values of the plurality of pixels in the image with a predetermined value; and generating a first set of irradiance maps corresponding to the plurality of pixels based on the scene and the initialized image, wherein each of the irradiance maps represents corresponding shading and shadow information on the real object caused by a corresponding portion of the light source. In some implementations, determining the lighting condition in the scene comprises: determining, based on the input image and the first set of irradiance maps, respective pixel values of the plurality of pixels in the image.

In some implementations, the image representing the light source is an image of a cross shape.

In some implementations, determining respective pixel values of the plurality of pixels in the image comprises: determining, based on the input image and the first set of irradiance maps, respective pixel values of the plurality of pixels in the image using a trained neural network.

In some implementations, determining respective pixel values of the plurality of pixels in the image comprises: determining, based on the input image and the first set of irradiance maps, respective pixel values of the plurality of pixels in the image progressively using a plurality of trained neural networks.

In some implementations, the plurality of trained neural networks comprise at least a first neural network and a second neural network. Determining respective pixel values of the plurality of pixels in the image comprises: determining, based on the input image and the first set of irradiance maps, a first pixel value of a first pixel in the plurality of pixels and pixel values of at least one pixel adjacent the first pixel using the first neural network; generating a second set of irradiance maps based on the first pixel, the at least one pixel and the scene, the second set of irradiance maps corresponding to a plurality of sub-pixels of the first pixel, the at least one pixel and a combination of pixels other than the first pixel and the at least one pixel among the plurality of pixels respectively; determining, based on the input image and the second set of irradiance maps, whether the first pixel is to be divided using the second neural network; and in response to determining that the first pixel is not to be divided, using the first pixel value as a final pixel value of the first pixel.

In some implementations, determining respective pixel values of the plurality of pixels in the image further comprises: in response to determining that the first pixel is to be divided, dividing the first pixel into the plurality of sub-pixels; and determining respective sub-pixel values of the plurality of sub-pixels.

In a third aspect, the subject matter described herein provides a computer program product tangibly stored in a non-transient computer storage medium and including computer executable instructions that, when executed by a device, causing the device to implement the method in the second aspect of the subject matter described herein.

In a fourth aspect, the subject matter described herein provides a computer readable medium having computer executable instructions stored thereon, the computer executable instructions, when executed by a device, causing the device to implement the method in the second aspect of the subject matter described herein.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. An electronic device, comprising:
  a processing unit; and
  a memory coupled to the processing unit and storing instructions for execution by the processing unit, the instructions, when executed by the processing unit, causing the device to perform acts comprising:
  obtaining an input image about a real object and a depth map corresponding to the input image;
    determining a scene in the input image based on the depth map;
    determining, based on the scene, shading and shadow information on the real object caused by a light source in the scene, wherein the light source is represented by an image of a predetermined shape, the image comprising a plurality of pixels corresponding to a plurality of portions of the light source, respective pixel values of the plurality of pixels representing respective irradiance intensities of the plurality of portions of the light source;
    wherein determining the shading and shadow information comprises:
      initializing respective pixel values of the plurality of pixels in the image with a predetermined value; and
      generating a first set of irradiance maps corresponding to the plurality of pixels based on the scene and the initialized image, wherein each of the irradiance maps represents corresponding shading and shadow information on the real object caused by a corresponding portion of the light source; and
    wherein determining the lighting condition in the scene comprises:
      determining, based on the input image and the first set of irradiance maps, respective pixel values of the plurality of pixels in the image; and
      determining a lighting condition in the scene caused by the light source based on the input image and the shading and shadow information.

2. The device of claim 1, wherein the acts further comprise:
  generating, based on the scene and the lighting condition, an output image comprising the real object and a virtual object, the output image synthesizing the virtual object into the scene of the input image.

3. The device of claim 1, wherein the scene comprises a surface for placement of the real object, and determining the scene comprises:
  converting the depth map into a point cloud;
  fitting a plurality of points in the point cloud into a plane, the plurality of points representing the surface; and
  reconstructing a plurality of points in the point cloud located above the plane into a three-dimensional mesh, the plane and the three-dimensional mesh jointly representing the scene in the input image.

4. The device of claim 1, wherein the image representing the light source is an image of a cross shape.

5. The device of claim 1, wherein determining respective pixel values of the plurality of pixels in the image comprises:
  determining, based on the input image and the first set of irradiance maps, respective pixel values of the plurality of pixels in the image using a trained neural network.

6. The device of claim 1, wherein determining respective pixel values of the plurality of pixels in the image comprises:
  determining, based on the input image and the first set of irradiance maps, respective pixel values of the plurality of pixels in the image progressively using a plurality of trained neural networks.

7. The device of claim 6, wherein the plurality of trained neural networks comprise at least a first neural network and a second neural network, and determining respective pixel values of the plurality of pixels in the image comprises:
  determining, based on the input image and the first set of irradiance maps, a first pixel value of a first pixel in the plurality of pixels and pixel values of at least one pixel adjacent the first pixel using the first neural network;
  generating a second set of irradiance maps based on the first pixel, the at least one pixel and the scene, the second set of irradiance maps corresponding to a plurality of sub-pixels of the first pixel, the at least one pixel and a combination of pixels other than the first pixel and the at least one pixel among the plurality of pixels respectively;
  determining, based on the input image and the second set of irradiance maps, whether the first pixel is to be divided using the second neural network; and
  in response to determining that the first pixel is not to be divided, using the first pixel value as a final pixel value of the first pixel.

8. The device of claim 7, wherein determining respective pixel values of the plurality of pixels in the image further comprises:
  in response to determining that the first pixel is to be divided, dividing the first pixel into the plurality of sub-pixels; and
  determining respective sub-pixel values of the plurality of sub-pixels.

9. A computer-implemented method, comprising:
  obtaining an input image about a real object and a depth map corresponding to the input image;
  determining a scene in the input image based on the depth map;

determining, based on the scene, shading and shadow information on the real object caused by a light source in the scene, wherein the light source is represented by an image of a predetermined shape, the image comprising a plurality of pixels corresponding to a plurality of portions of the light source, respective pixel values of the plurality of pixels representing respective irradiance intensities of the plurality of portions of the light source;

wherein determining the shading and shadow information comprises:

initializing respective pixel values of the plurality of pixels in the image with a predetermined value; and generating a first set of irradiance maps corresponding to the plurality of pixels based on the scene and the initialized image, wherein each of the irradiance maps represents corresponding shading and shadow information on the real object caused by a corresponding portion of the light source; and wherein determining the lighting condition in the scene comprises:

determining, based on the input image and the first set of irradiance maps, respective pixel values of the plurality of pixels in the image; and determining a lighting condition in the scene caused by the light source based on the input image and the shading and shadow information.

10. The method of claim 9, further comprising:

generating, based on the scene and the lighting condition, an output image comprising the real object and a virtual object, the output image synthesizing the virtual object into the scene of the input image.

11. The method of claim 9, wherein the scene comprises a surface for placement of the real object, and determining the scene comprises:

converting the depth map into a point cloud;

fitting a plurality of points in the point cloud into a plane, the plurality of points representing the surface; and reconstructing a plurality of points in the point cloud located above the plane into a three-dimensional mesh, the plane and the three-dimensional mesh jointly representing the scene in the input image.

12. The method of claim 10, wherein the image representing the light source is an image of a cross shape.

13. The method of claim 10, wherein determining respective pixel values of the plurality of pixels in the image comprises:

determining, based on the input image and the first set of irradiance maps, respective pixel values of the plurality of pixels in the image using a trained neural network.

14. A non-transitory machine-readable medium storing instructions which, when executed by one or more machines, cause the one or more machines to perform operations comprising:

obtaining an input image about a real object and a depth map corresponding to the input image;

determining a scene in the input image based on the depth map;

determining, based on the scene, shading and shadow information on the real object caused by a light source in the scene, wherein the light source is represented by an image of a predetermined shape, the image comprising a plurality of pixels corresponding to a plurality of portions of the light source, respective pixel values of the plurality of pixels representing respective irradiance intensities of the plurality of portions of the light source;

wherein determining the shading and shadow information comprises:

initializing respective pixel values of the plurality of pixels in the image with a predetermined value; and generating a first set of irradiance maps corresponding to the plurality of pixels based on the scene and the initialized image, wherein each of the irradiance maps represents corresponding shading and shadow information on the real object caused by a corresponding portion of the light source; and wherein determining the lighting condition in the scene comprises:

determining, based on the input image and the first set of irradiance maps, respective pixel values of the plurality of pixels in the image; and determining a lighting condition in the scene caused by the light source based on the input image and the shading and shadow information.

15. The machine-readable medium of claim 14, the operations further comprising:

generating, based on the scene and the lighting condition, an output image comprising the real object and a virtual object, the output image synthesizing the virtual object into the scene of the input image.

16. The machine-readable medium of claim 14, wherein the scene comprises a surface for placement of the real object, and determining the scene comprises:

converting the depth map into a point cloud;

fitting a plurality of points in the point cloud into a plane, the plurality of points representing the surface; and reconstructing a plurality of points in the point cloud located above the plane into a three-dimensional mesh, the plane and the three-dimensional mesh jointly representing the scene in the input image.

17. The machine-readable medium of claim 14, wherein the image representing the light source is an image of a cross shape.

18. The machine-readable medium of claim 14, wherein determining respective pixel values of the plurality of pixels in the image comprises:

determining, based on the input image and the first set of irradiance maps, respective pixel values of the plurality of pixels in the image using a trained neural network.

* * * * *